United States Patent [19]

Ledet

[11] Patent Number: 5,720,591
[45] Date of Patent: Feb. 24, 1998

[54] TILTING PLATFORM

[75] Inventor: Roger Joseph Ledet, Winnipeg, Canada

[73] Assignee: The Boeing Company, Seattle, Wash.

[21] Appl. No.: 671,147

[22] Filed: Jun. 24, 1996

[51] Int. Cl.⁶ .................................................. B23Q 1/25
[52] U.S. Cl. .............................. 414/778; 108/5; 108/7; 269/289 R
[58] Field of Search ........................ 254/98; 269/60, 269/289 R, 309; 298/17.5, 17.8, 19 R, 22 D, 22 J, 22 P; 414/778, 678, 589; 108/5, 7, 8, 9

[56] References Cited

U.S. PATENT DOCUMENTS

| | | | |
|---|---|---|---|
| 2,187,312 | 1/1940 | Goodlake | 146/102 |
| 3,201,814 | 8/1965 | LeClear | 14/71 |
| 3,491,394 | 1/1970 | LeClear | 14/72 |
| 3,500,486 | 3/1970 | LeClear | 14/71 |
| 3,786,530 | 1/1974 | LeClear | 14/71 |
| 4,209,869 | 7/1980 | Trine et al. | 14/69.5 |
| 4,474,115 | 10/1984 | Carlton | 108/7 |
| 4,539,913 | 9/1985 | Marchant | 108/7 |
| 4,568,028 | 2/1986 | Verseef et al. | 298/22 P X |
| 4,637,322 | 1/1987 | Hampshire et al. | 108/102 |
| 4,760,997 | 8/1988 | Fäger | 269/309 X |

*Primary Examiner*—Janice L. Krizek
*Attorney, Agent, or Firm*—Lawrence W. Nelson

[57] ABSTRACT

A tilting platform that elevates and tilts an object while maintaining a center of gravity of the object about a center line of the platform. The platform includes a surface upon which the object is fastened, and a plurality of slideable sections each having a forward end coupled to a forward end of the surface. The slideable sections are retractable. The tilting plaform also includes a base coupled to a forward end of each of the plurality of slideable sections, where the plurality of slideable sections are retractable into the base, an actuator that retracts and expands the plurality of the slideable sections uniformly along the direction of the base, and the vertical linkage, coupled to the base, and coupled to the surface to cause the surface to tilt as the plurality of slideable sections are retracted by the actuator.

12 Claims, 5 Drawing Sheets

TILTING PLATFORM

TECHNICAL FIELD

The present invention relates to a tilting platform and more particularly to a tilting platform that lifts an objects as well as tilts the object.

BACKGROUND OF INVENTION

Various manufacturing processes require repetitive tasks. Often, these repetitive tasks require a worker to position himself in an awkward manner. For example, as shown in FIG. 1, when creating a pre-impregnated fiber glass or graphite epoxy structure, layers of a material 100 are placed one upon the other into a layup mandrel 104. As shown in FIG. 1, a worker 102 must stoop down to apply a first layer of the material 100, then repeatedly stoop down to apply subsequent layers of the material 100 until a completed structure has been formed. The structure is then cured and removed from the mandrel 104.

Constant stooping by the worker 102 presents ergonomic risks, potentially resulting in severe back pain and neck cramps. At present, attempts to alleviate these problems include alternating personnel for each task so that one individual worker isn't required to constantly stoop over and potentially strain or injure himself in repeated operations. Another manner in which these problems have been addressed has been to place the mandrel 104 on a stand 106 to allow the worker 102 to reach inside the mandrel 104 without bending completely over. However, this measure alone was not sufficient to prevent the occasional need of a worker 102 to position himself in a manner that could potentially cause pain or injury.

If the stand 106 is made tall enough so the worker 102 does not have to bend over, then the worker 102 will be unable to see within the middle portion 108 of the mandrel 104. In response to this problem, a propping device 110, as shown in FIG. 2, could potentially be used to raise a portion of the mandrel 104 upwardly thereby placing the middle portion 108 of the mandrel 104 in the line of sight of the worker 102. However, the use of the propping device 110 potentially places the mandrel 104 into an unstable condition. This is because the propping device 110 prevents the mandrel 104 from being securely fastened to the stand 106. Further, by tilting the mandrel 104 in the manner shown in FIG. 2, the center of gravity of the mandrel 104 is shifted forward in direction 111, toward the worker 102 and away from the center line of the stand 106. The shift in the center of gravity will cause the mandrel 104 and the material 100 within it to become unstable. If shifted enough, mandrel 104 and potentially stand 106 may fall toward the worker 102 causing serious injury to the worker 102 and/or the mandrel 104. Another disadvantage of this arrangement is that the tilt and the height of the mandrel 104 cannot easily be adjusted for workers of different heights, or when using mandrels of different sizes.

Accordingly, a need in the field exists for a device that will both raise and tilt an object allowing a worker to conduct a repetitive task. The needed device must maintain its stability preferably by keeping the center of gravity of the object being used at a point near the center line of a stand upon which it has been placed. Further, there is a need for a device which is compact enough to fit on the stand and when actuated does not provide any further encumbrances and which applies an even force during the tilting process.

SUMMARY OF THE INVENTION

In accordance with one aspect of the present invention, a tilting platform elevates and tilts an object while maintaining a center of gravity of the object about a center line of the platform. The platform includes a surface upon which the object is fastened, and a plurality of slideable sections each having a forward end coupled to a forward end of the surface. The slideable sections are retractable. The tilting plaform also includes a base coupled to a forward end of each of the plurality of slideable sections, where the plurality of slideable sections are retractable into the base, an actuator that retracts and expands the plurality of the slideable sections uniformly along the direction of the base, and the vertical linkage, coupled to the base, and coupled to the surface to cause the surface to tilt as the plurality of slideable sections are retracted by the actuator.

DETAILED DESCRIPTION

Figure 3:
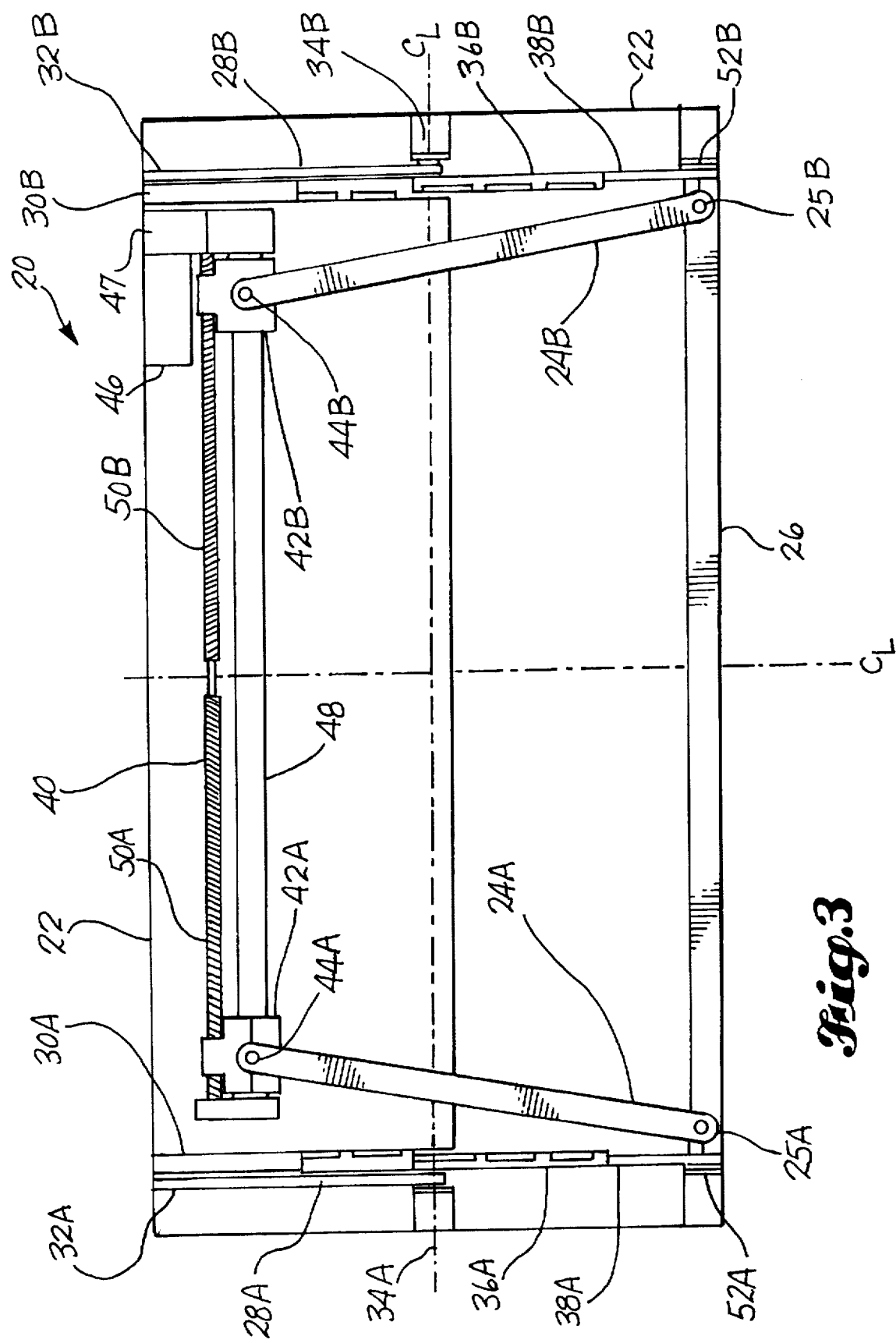
FIG. 3 shows a top plan view of a tilting platform in the horizontal position.
Figure 4:
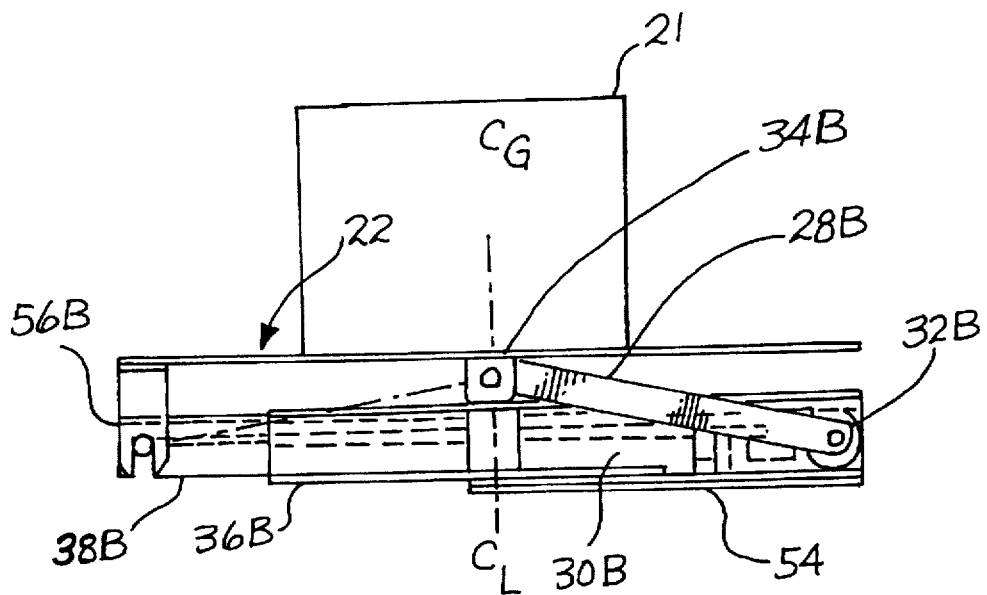
FIG. 4 shows a side view of the tilting platform in the horizontal position.

FIGS. 3 and 4 show a tilting platform 20 of the present invention that allows safe and ergonomic positioning of an object 21 by tilting and raising the object 21 in such a manner as to ensure that its center of gravity $C_G$ stays relatively aligned with a center line $C_L$ of the platform 20.

As shown in FIGS. 3 and 4, the platform 20 includes a tilting table surface 22 which is connected through paired linkages 24A and 24B at pins 25A and 25B, respectively, via cross member 26. A set of paired links 28A and 28B are rotatably attached to respective fixed ends of slide rail assemblies 38A and 38B with pins 32A and 32B. The respective opposite ends of the paired links 28A and 28B are rotatably attached to the table surface 22 using pins 34A and 34B. The slide rail assemblies 30A and 30B each have a respective middle telescopic section 36A and 36B as well as end telescopic sections 38A and 38B. When the table surface 22 is in a horizontal position, the middle telescopic sections 36A and 36B, as well as the end telescopic sections 38A and 38B are fully extended outwardly from the slide rail assemblies 30A and 30B. As the table surface 22 proceeds to tilt, middle telescopic sections 36A and 36B as well as the end telescopic sections 38A and 38B retract into the slide rail assemblies 30A and 30B.

Figure 1:
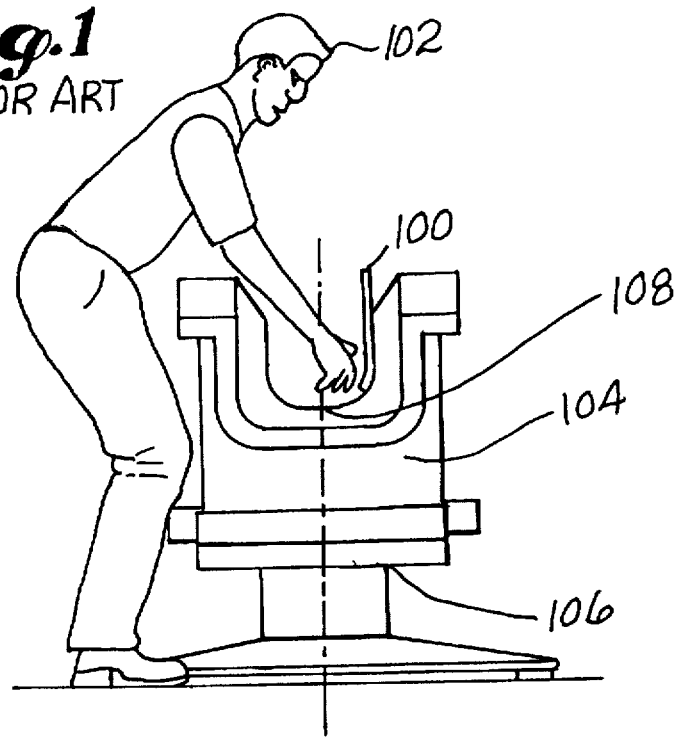
FIG. 1 shows a prior art method of creating a multi-layer structure.
Figure 2:
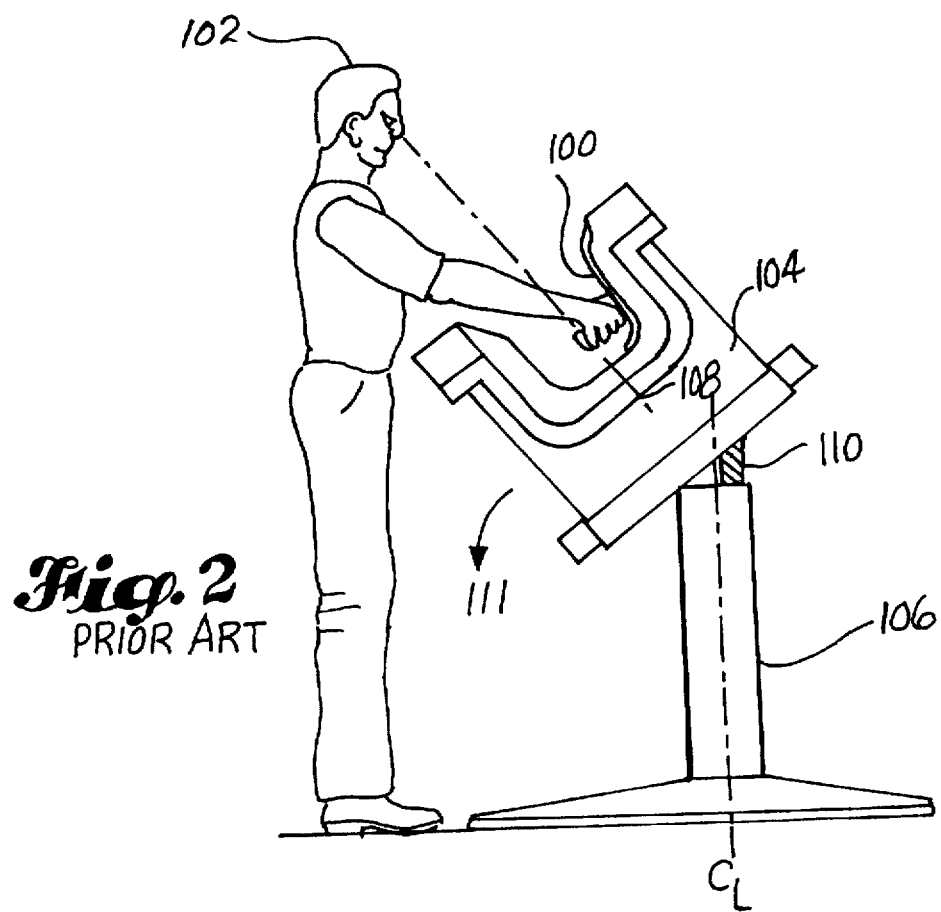
FIG. 2 shows a prior art method of tilting the multi-layer structure.

The paired linkages 24A and 24B are both coupled to a lead screw 40 via respective sliding nuts 42A and 42B. The connection between the paired linkage 24A and 24B with the sliding nuts 42A and 42B is rotatable about pins 44A and 44B, respectively. In an alternative embodiment, paired linkages 24A and 24B may be crossed to form a scissor linkage arrangement to provide a more compact drive mechanism. A motor 46 has a shaft and gearing (not shown) in a housing 47 that is coupled to the lead screw 40 in a manner allowing the motor 46 to rotate the lead screw 40 upon activation of the motor 46. The lead screw 40 is driven by the motor 46 which synchronizes the motion of the sliding nuts 42A and 42B along a linear guide 48. The lead screw 40 has threads 50A on one end and 50B on an opposing end, where the threads 50A rotate in a direction opposite to the threads of 50B. Thus, when the lead screw 40 is rotated by the motor 46, the slide nuts 42A and 42B either converge or diverge along the linear guide 48 depending upon the direction of rotation of the lead screw 40. Ends 52A and 52B of the end telescopic sections 38A and 38B are interconnected with the cross-member 26. The cross-member 26 on the telescopic sections 38A and 38B is coupled to the table top 22 using pins 56A and 56B. A base plate 54 is preferably fastened to a support stand (not shown), similar to that shown in FIG. 1.

Figure 6:
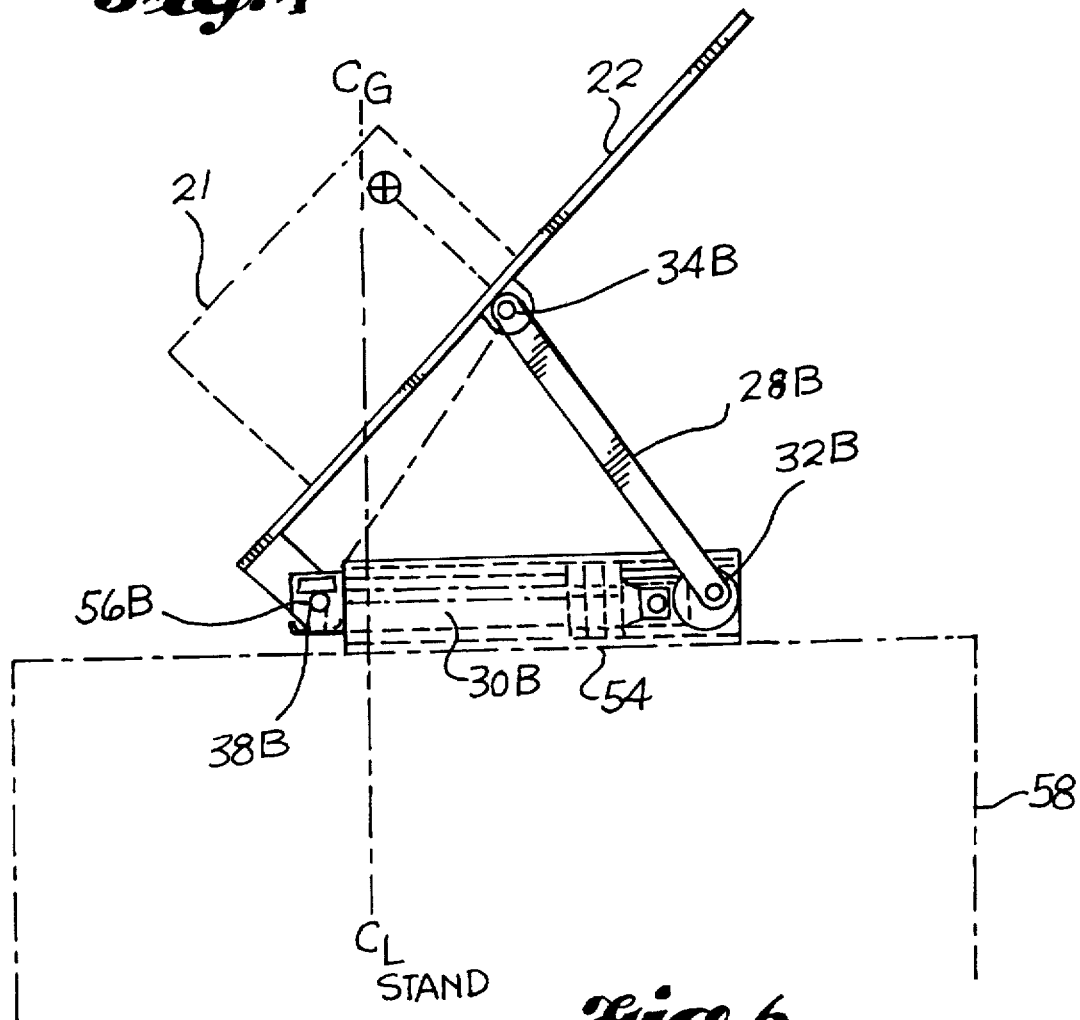
FIG. 6 shows a side view of the tilting platform in the tilted position.
Figure 5:
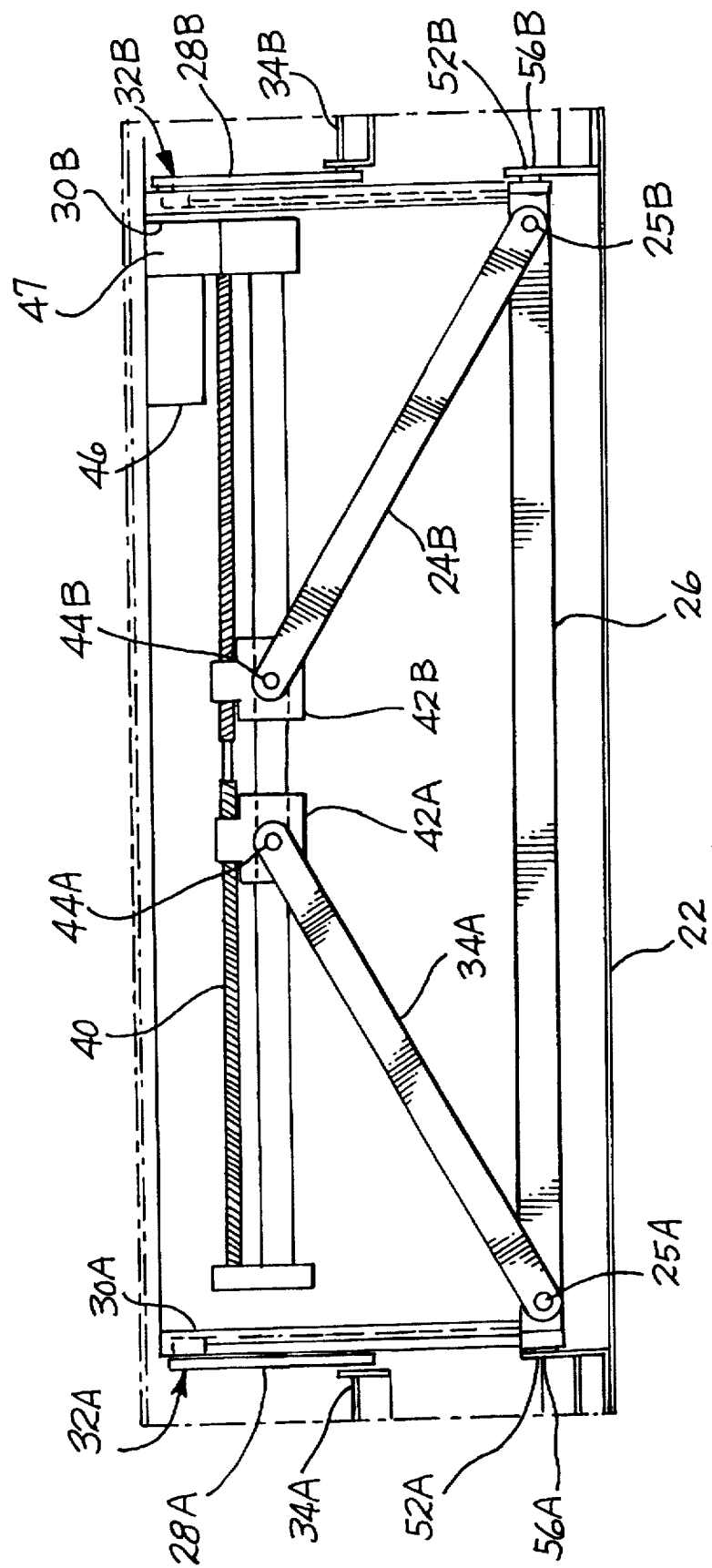
FIG. 5 shows a top-plan view of the tilting platform in a tilted position.

As shown in FIG. 5, the rotation of the lead screw 40, causes the sliding nuts 42A and 42B to converge. The convergence forces links 24A and 24B to draw in telescopic sections 38A and 38B into a retracted position, as shown in FIG. 6. If the convergence continues, the middle telescopic section 36A and 36B will also be retracted into the slide rail assemblies 30A and 30B. The fixed length of the links 28A and 28B and the ability to rotate about pins 32A and 32B cause the table surface 22 to tilt as the telescopic assemblies 36A, 36B, 38A, and 38B retract into the slide rail assemblies 30A and 30B. By causing the telescopic sections to retract as part of the tilting process, there are no protruding members in front of the platform 20 to encumber the worker 102. This would not be the case if a track assembly were used.

Initially, the angle of the linkage 24A and 24B with respect to the lead screw 40 as well as to the cross member 26 provides a mechanical advantage to compensate for a mechanical disadvantage resulting from the angular relations between the component's connecting pins 32B, 34B, and 56B, as well as the respective inter-connections of 32A, 34A, and 56A. Until the angle between the paired links 28A and 28B form a significant angle with the table surface 22, the vertical force component pushing up on the object 21 will be very small. Thus, the difficulty due to the lesser vertical component at the initial tilting of the table surface 22 is offset by the efficiency at which a force is applied via motor 46 to the paired linkages 24A and 24B. The mechanical advantage of the angular relation of the lead screw 40 to links 24A and 24B as well as to the cross member 26 decreases as the object 21 is raised (i.e., the table surface is tilted) to the position shown in FIG. 6. However, the force required to retract the telescopic assemblies 36A, 36B, 38A, and 38B and the vertical component necessary to lift the object 21 on the table surface 22 also decreases as the table surface 22 tilts to the position shown in FIG. 6. Here, the decrease in retraction and lifting force is a result of the change in geometry between the three main pivot points at pins 56A, 56B, 34A, 34B, and 32A, 32B. Therefore, the angular arrangement described above keeps the demands on the motor 46 relatively constant over the lifting/tilting process instead of requiring an extremely large force at the initial moments of the tilting process, and almost no force near the end of the tilting process. To ensure the application of a uniform force, the angle between linkages 24A and 24B to the lead screw 40 summed with the angle of the surface 22 with the paired links 28A and 28B remains at a constant predetermined angle such as 90°. Preferably, an angle formed between the linkages 24A and 24B with the base 54 is greater than zero, allowing a vertical component of the force to be applied in repositioning the table surface 22 when the telescopic sections are initially retracted.

The self-compensating nature of the lift and tilt linkage system minimizes the size of the motor 46 and the size of the lead screw 40. Further, the even application of force by the motor 46 and lead screw 40 applied to the platform 20 increases the stability of the entire platform 20 during the lifting/tilting process. Additional stability of the object 21 may be obtained by holding the object 21 in position either with a ledge, clamps, a pegging system, or straps, all of which are well known in the art.

FIG. 4 shows the typical center of gravity, denoted $C_G$, for the object 21 properly positioned on the table surface 22. By causing the table surface 22 to retract in a direction opposite the direction of tilt, the table surface 22 not only elevates the center of gravity $C_G$ near the center line $C_L$, of the tilting platform 20 but also keeps the center of gravity aligned with the center line $C_L$ of the platform 20, as shown in FIG. 6. For example, if the base 54 of the platform 20 is initially placed on a stand 58, shown in FIG. 6, so that the center line $C_L$ of the platform 20 matches the center line $C_L$ of the stand 58, then, when the object 21 is initially placed on the table surface 22 so that its center of gravity matches both the center line $C_L$ of the platform 20 and the center line $C_L$ of the stand 58, the center of gravity of the object 21 will approximately maintain its alignment with the centerline $C_L$ of the stand 58 as the object 21 is lifted and tilted. Thus, there is no increase in the tendency for the entire platform 20 and the stand 58 to fall upon the worker 102 during or after the tilting process.

In a preferred embodiment, the geometry formed by pins 56A and 56B, pins 34A and 34B, as well as pins 32A and 32B can be altered to accommodate various tilt angle requirements and to compensate for varying positions of the center of gravity $C_G$ of the object 21 relative to the table surface 22. Altering the geometry can also be used to adjust the demands on the actuator at various stages of the tilting process. One method for adjusting the geometry of the tilt of the platform 20 is to make linkages 24A and 24B adjustable in length, as is well known in the art.

Figure 7:
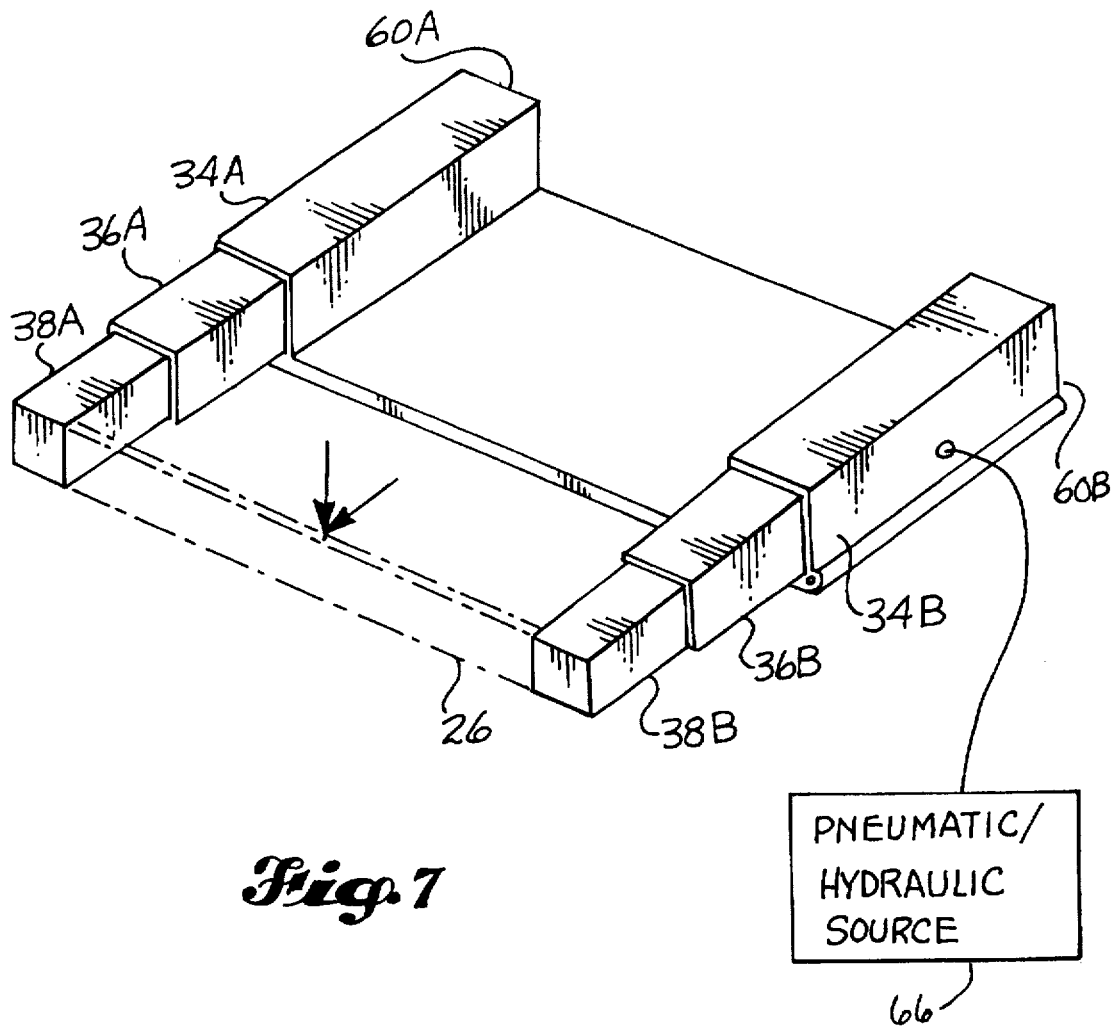
FIG. 7 shows a second embodiment of the tilting platform.

In a second embodiment, the lead screw 40, the motor 46, the linkages 24A and 24B, and the slide nuts 42A and 42B are replaced by linear actuators 60A and 60B within the slide assemblies 34A and 34B, as shown in FIG. 7. It is also possible to rely on a single actuator. The driving means of the actuators 60A and 60B can be an electric or manual screw-drive mechanism, and pneumatic mechanism, or an hydraulic mechanism. Preferably, the actuators 60A and 60B are elekromotoren AG4410 LIESTAL actuators produced by Magnetic. These actuators 60A and 60B drive their respective middle telescopic sections 36A and 36B as well as their respective end telescopic sections 38A and 38B in and out of the slide assemblies 34A and 34B using a pneumatic/hydraulic source 66. The advantage of this construction is that there are fewer moving parts and that the drive system is more self contained. Further, the slide assemblies 34A and 34B may be positioned close to one another, thereby reducing the number of encumbrances as well as the footprint of the platform 20. However, the embodiment has the drawback of requiring an extremely large initial force by the actuators 60A and 60B to lift the object 21, since there is no longer the mechanical advantage provided by the angular positioning of the force applying linkage described in the first embodiment. Instead of a relatively constant demand upon the driving source, in this embodiment, the demand placed on the driving source, actuators 60A and 60B, decreases from a large initial force at the extended position to a lesser force when the telescopic sections are retracted to tilt the object 21.

Accordingly, the present invention both elevates and tilts an object by desired amounts to allow easy access to the object by a worker. The tilting is performed in such a manner that the center of gravity of the object remains close to the vertical center line of a supporting base to prevent the object from tipping over onto the worker. This arrangement allows the use of a narrow support base while still maintaining the same level of stability. In the first embodiment, the driving mechanism allows a relatively small motor to be used, and ensures a smooth, even and stable lifting/tilting action. Further, in either embodiment, all the linkages and actuators are located beneath the table surface. Even in a tilted position, the linkages remain under the table surface to provide a safe and unencumbered work space. Also, this arrangement keeps the footprint of the platform 20 to a minimum, thereby reducing the amount of shop space required to perform an operation on the object. The compactness of the platform 20 allows it to be used in various situations ranging from the top of a workbench, to being floor mounted, or used in conjunction with another lifting device or stand.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-identified embodiments may be made without departing from the spirit and scope of the invention. Therefore, the invention is to be limited only by the following claims.

What is claimed is:

1. A tilting platform that elevates and tilts an object while maintaining a center of gravity of the object about a center line of the platform, said platform comprising:

a surface upon which the object is fastened, said surface having a forward end and a rear end;

a plurality of slideable sections each having a forward end coupled to a forward end of said surface and a rearward end, said slideable sections being retractable and extendible, a base slideably receiving the rearward end of each of said plurality of slideable sections, wherein said plurality of slideable sections are retractable and extendible along a direction of said base;

an actuator that retracts and extends said plurality of said slideable sections uniformly along the direction of said base, sliding said forward end of said surface relative to said base; and vertical linkage, coupled to said base, and coupled to said surface to cause said surface to tilt as said plurality of slideable sections are retracted by said actuator.

2. The tilting platform according to claim 1 wherein coupling points between one of said plurality of slideable sections and said base, said base and said vertical linkage, and said vertical linkage and said surface, form three pivot points.

3. The tilting platform according to claim 1 wherein said actuator comprises a pneumatically powered piston.

4. The tilting platform according to claim 1 wherein said actuator comprises a hydraulically activated piston.

5. The tilting platform according to claim 1 wherein said actuator comprises an electrically driven screw drive assembly.

6. A tilting platform that elevates and tilts an object while maintaining a center of gravity of the object about a center line of the platform, said platform comprising:.

a surface upon which the object is fastened;

a plurality of slideable sections each having a forward end coupled to a forward end of said surface and a rearward end, said slideable sections being retractable and extendible;

a base slideably receiving the rearward end of each of said plurality of slideable sections, wherein said plurality of slideable sections are retractable and extendible along a direction of said base;

an actuator that retracts and extends said plurality of said slideable sections uniformly along the direction of said base, wherein said actuator further comprises:

a motor, rotatably coupled to a threaded rod having two ends, and one of the ends having a thread running in a direction opposite to a direction of a thread of the other one of the ends;

slideable nut assemblies rotatably coupled to each of the two ends of said threaded rod;

a pair of horizontal linkages each having two ends, each of said horizontal linkages coupled to a respective one of the slideable nut assemblies at one of the ends of the horizontal linkage and coupled to a respective one of said plurality of slideable sections at the other of the ends of the horizontal linkages, wherein when said motor is rotated in one direction, said nut assemblies converge along said threaded rod causing said plurality of slideable sections to retract, and said surface to tilt, and wherein when the motor rotates in an opposite direction, said slideable nut assemblies diverge along said threaded rod causing said plurality of slideable sections to expand; and vertical linkage, coupled to said base, and coupled to said surface to cause said surface to tilt as said plurality of slideable sections are retracted by said actuator.

7. The tilting platform according to claim 6 wherein said plurality of slideable sections comprises two telescopically extending units.

8. The tilting platform according to claim 7 wherein an angle formed between each of said pair of horizontal linkages and said threaded rod decreases as said surface is tilted.

9. The tilting platform according to claim 8 wherein an angle between said surface and said vertical linkage increases as said surface is tilted.

10. The tilting platform according to claim 9 wherein said angle between said horizontal linkages and said threaded rod when added to said angle between said surface and said vertical linkage is approximately a constant predetermined angle.

11. The tilting platform according to claim 10 wherein maintaining said constant predetermined angle ensures that a vertical force component applied to the object remains relatively constant.

12. The tilting platform according to claim 10 wherein said constant predetermined angle comprises approximately 90°.

* * * * *